Feb. 4, 1964  H. K. BRADFORD  3,120,638
TWIN-T NETWORK UNBALANCE MEASURING SYSTEM
Filed March 18, 1960
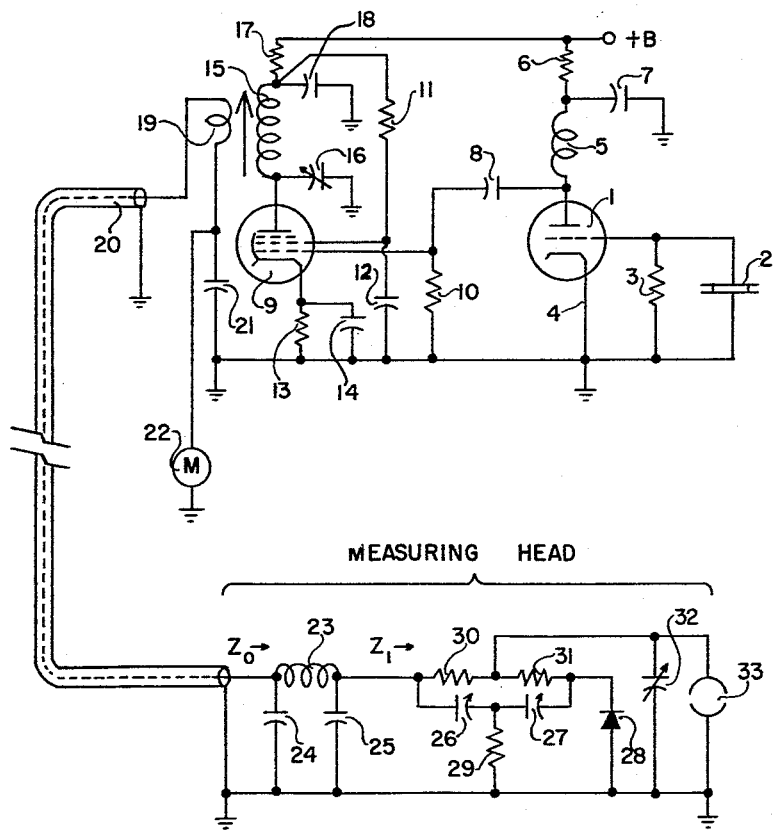
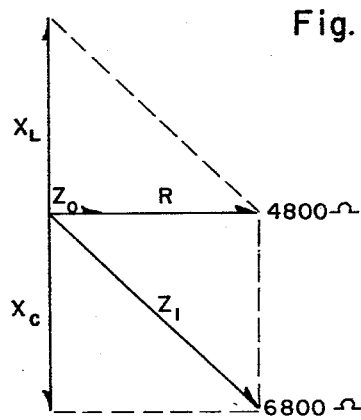
Fig. 1
Fig. 2
INVENTOR.
HENRY K. BRADFORD
BY
Alexander & Dowell
ATTORNEYS

United States Patent Office 3,120,638
Patented Feb. 4, 1964

3,120,638
TWIN-T NETWORK UNBALANCE MEASURING SYSTEM
Henry K. Bradford, Fairfax, Va., assignor to American Machine & Foundry Company, a corporation of New Jersey
Filed Mar. 18, 1960, Ser. No. 16,028
5 Claims. (Cl. 324—60)

The present invention relates to measuring systems for monitoring instantaneous values which are measurable by means of one or more sensing elements included in the system, and especially for sensing variations of said values from a predetermined value serving as a standard for comparison.

It is a principal object of the invention to provide an improved and simplified stable measuring system including a network which can be balanced to null condition when a sensing element connected therewith is measuring said predetermined value, and which when so adjusted measures subsequent variations from said predetermined value and provides readings in proportion to the degree of unbalance of said network from nulled condition.

Still another major object of the invention is to provide a stable measuring system in which the detector is connected directly to the null network, and forms therewith a measuring head, the null network having a single-ended input and a single-ended output both with reference to a common ground and one terminal of the detector being also directly grounded. The use of this type of network makes it possible to remotely locate said measuring head with respect to the source of continuous wave, and to join the measuring head to said source by means of a single cable which serves both to transmit the continuous wave from the source to the measuring head and at the same time to transmit the direct-current component back from the detector to a measuring meter remotely located at the source-end of the cable and having one terminal grounded. The D.C. component represents the instantaneous degree of unbalance of the network, which unbalance is proportional to the deviation of the value being measured from said predetermined value at which the network would be in nulled condition.

The twin-T network has been selected as the measuring network because of its stability and because of the accuracy and the ease with which it can be nulled in a practical embodiment, for instance for dielectric measurement of the weight of tobacco in manufactured cigarettes. The drawing in the present disclosure illustrates an embodiment employing a twin-T network, which is single-ended, both as to input and output, and has a direct-current path therethrough so that the detector can be located on one side of the network and the D.C. output component from the detector can be measured on the opposite side of the network, thus permitting a measuring instrument structure wherein the source of continuous wave and the measurement meter can both be located at the opposite end of a cable from the instrument's measuring head. This type of network is discussed per se in Terman's "Radio Engineers Handbook," McGraw-Hill Book Co., First edition, 1943, at page 918.

In the preferred embodiment of the system as set forth in the present disclosure, a power oscillator is employed to deliver RF power at 10 megacycles to a 50-ohm coaxial cable which is connected at its other end to a twin-T null network which is in turn matched to the 50-ohm line by a pi impedance-matching section. The other end of the twin-T network is connected with a detector comprising a diode having one terminal connected to the common ground. When the twin-T network is nulled, no output is impressed across the diode detector in view of the fact that the output current through one of the branches of the twin-T network is exactly cancelled out by the out-of-phase output current through the other path of the network.

The twin-T network comprises a plurality of capacitors and resistors, at least one of which is used as a sensing element. In the present embodiment, one of the capacitors is employed as a dielectric sensing element. The output delivered from the twin-T network to the detector is directly proportional in amplitude to the amount of unbalance of this network, said unbalance permitting some of the 10 megacycle signal to appear across the detector. The detected D.C. voltage is coupled back through the twin-T network to the center conductor of the coaxial cable and can be detected with a voltmeter, or milliameter, located at either end of the cable, at the source end of the cable in the present embodiment. When using the twin-T null network, the D.C. output of the detector is quite linear with respect to changes measured by the sensing capacitor over a considerable range, after the threshold value at which the diode becomes conductive is exceeded.

It is another important object of the invention to couple the RF source and the output meter through a cable to the null network and detector comprising the measuring head, and to employ a low impedance cable which in turn is matched to the null network when the latter is balanced, an impedance matching section being used to couple the cable to the null network. The actual changes in value of the sensing element of the null network are relatively small during the taking of measurements, and therefore the impedance presented by the null network to the matching section is affected only to an insignificant extent. By this means the network sensitivity and general operating characteristics are made substantially independent of the length of the impedance-matched cable.

Moreover, better stability is maintained in the measuring head which employs the twin-T network in view of the fact that the impedance matching is not dependent upon the precise tuning of any of the elements to resonance in either the matching section, the null network, or both networks considered together. Furthermore, in the present system, high-frequency balancing is avoided.

Still another important object of the invention is to provide an impedance transformation in said impedance matching section which permits the coupling of a low impedance cable to a relatively high impedance twin-T network so that comparatively small values of capacity can be employed in the capacitive sensing element whereby the percentage of capacity change during measurements can be relatively greater and thereby provide maximum sensitivity to variations in the values being measured.

In the working embodiment of this invention, assuming that about 1½ watts of RF energy is supplied from the source to the measuring head, a sensitivity of about one volt D.C. output is obtained per micromicrofarad change in the sensing element.

Other objects and advantages of the present invention will become apparent during the following discussion of the drawing wherein:

FIG. 1 is a schematic diagram of a measuring system according to the present invention including a twin-T null network in the measuring head; and FIG. 2 is a graphical illustration used in connection with the explanation of FIG. 1.

Referring now to the drawing, and in particular to FIG. 1, the upper portion of this figure illustrates a source of continuous wave including an oscillator and a power amplifier. The oscillator comprises a triode 1 having a frequency-determining crystal 2 in its grid circuit connected across a grid return resistor 3 and having its cathode 4 grounded. In the plate circuit is a load inductance 5 connected with a source B+ of approximately 300 volts and isolated therefrom by a resistor 6 and condenser 7. This is a conventional type of oscillator and is coupled by means of a coupling condenser 8 with the grid of a pentode power amplifier 9. The grid of this amplifier is also provided with a grid return resistance in the usual manner. The screen circuit of the tube 9 is connected to high-voltage by means of a resistance 11 and the screen grid is further bypassed to ground by a capacitor 12. The power amplifier also has a cathode resistor 13 and a cathode bypass condenser 14 by which the tube 9 is self-biased. The plate circuit of the power amplifier 9 comprises an inductance 15 which is tuned to resonance at the frequency of the oscillator 1 by means of a tuning condenser 16, and the other end of the inductance 15 is isolated from the B+ supply by means of a resistance 17 and a condenser 18.

The inductance 15 is also associated with another winding 19 which couples the output of the power amplifier 9 to a coaxial cable 20, having its outer conductor grounded and its inner conductor connected with the coil 19. The capacitor 21 serves the dual purpose of returning the lower end of the winding 19 to RF ground, and also the capacitor 21 performs a filtering action across the output meter 22 in a manner to be hereinafter described.

The cable 20 is shown broken so as to illustrate that the length thereof can be selected in any suitable manner, because the cable is matched to the respective input and output units.

The outer conductor of the cable 21 is connected at its right end to ground and the inner conductor of the cable is connected with an impedance matching pi section including a inductance 23 and capacitors 24 and 25. The pi section performs two functions, one of which is the transformation of the impedance from the impedance level of the coaxial cable 20 to the impedance level of the null network which is connected to the right end of the pi section. The other function performed by the pi section 23 involves the tuning out of the capacitive reactance presented by the twin-T network input to the output of the pi section, in the manner to be presently described.

The lower ends of the capacitors 24—25 are grounded, and the output to the twin-T network is taken from the junction between the inductance 23 and the capacitor 25.

The twin-T network has two RC branches connected mutually in parallel and between the pi-network and a detector diode 28. One branch comprises two identical capacitors 26 and 27 connected in series and a resistance leg comprising a resistor 29 of fixed value connected between ground and the junction of the capacitors 26—27. The other branch of the twin-T network comprises two identical resistances 30 and 31 connected in series, and a shunt capacitive leg including two parallel-connected capacitors 32 and 33 connected between the junction of the resistances 30 and 31 and ground. These shunt capacitors 32 and 33 comprise a part of the null network and include the sensing element 33 and the parallel-connected capacitor 32 which serves as a padder to bring the composite capacity of the capacitors 32 and 33 to the correct value for nulling the twin-T network.

The operation of the circuit of FIG. 1 is as follows. The oscillator 1 provides a continuous wave at a frequency, for instance of 10 megacycles as determined by the crystal 2, and this wave is amplified by the power amplifier tube 9. The output of the power amplifier tube 9 appears across the tuned circuit including the inductance 15 and the capacitor 16, and the output is delivered by winding 19 at the correct impedance level, for instance 50 ohms, to the coaxial cable 20.

The input impedance $Z_1$ of the twin-T network including the elements 26, 27, 29, 30, 31, 32 and 33 is approximately 6800 ohms for the circuit values appearing in the table at the end of this specification. This 6800 ohm value is not pure resistance but includes a capacitive component $Xc$ as shown in FIG. 2. In other words, the impedance $Z_1$ looking into the twin-T network is 6800 ohms, and this impedance can be divided into approximately 4800 ohms of pure resistance R and 4800 ohms of capacitive reactance $Xc$ as represented in FIG. 2 by the vectors R and $Xc$. In order to match the 50-ohm characteristic impedance $Z_0$ of the coaxial cable to the impendance $Z_1$ of the twin-T network, the pi section including components 23, 24 and 25 is employed, and the set of practical values for these components is given at the end of this specification. These circuit values are such that the imput impedance $Z_0$ to the pi section is 50 ohms and so that the output impedance therefrom includes a 4800-ohm resistive component R and a 4800 inductive reactance component $X_1$. Thus, the 4800-ohm reactance $X_1$ at the output of the pi section cancels the 4800-ohm capacitive reactance $Xc$ at the input of the twin-T network and results in pure resistance matching between the pi section and the twin-T network.

If both branches of the twin-T network are exactly balanced, a null condition results in which the output through one branch includes a positive-reactance component, and the other branch includes a negative reactance component. These two components can be made to cancel each other by making them 180° out of phase. The result of this mutual phase displacement is that no component of the RF continuous wave applied to the input of the twin-T network appears at the detector diode 28, meaning that the current through one branch of the twin-T network has cancelled the current through the other branch thereof and the two branches are balanced and result in a null condition. Because of the fact that the sensing capacitor 33 forms a part of this twin-T network, if the dielectric between the two plates of this condenser changes, thereby changing the capacity, the twin-T network becomes unbalanced so that the null condition is upset and a current is delivered to the diode detector 28. Thus, a D.C. potential appears across this detector and can be measured with respect to ground at any point in the circuit which is connected with the detector by way of a D.C. path. Such a path is provided through the resistors 30 and 31 and through the inductance 23 to the coaxial cable and thence through the winding 19 to the meter 22 which reads values of direct-current potential which are in turn representative of the degree of unbalance of the twin-T network. According to actual tests, within practical limits the D.C. voltage appearing at the meter 22 is substantially directly proportional to the capacitive changes at the plates of the sensing capacitor 33.

The following numerical values are given for the various components in FIGURE 1 for the purpose of illustrating a working embodiment:

Crystal 2—10 megacycles.
Resistors 3 and 10—47000 ohms.
Resistors 6, 13 and 17—1000 ohms.
Resistor 11—56000 ohms.
Inductance 5—RF choke.
Winding 15 and capacitor 16—resonant at 10 megacycles.
Capacitors 7, 12, 14, 18 and 21—.01 microfarad.
Capacitor 8—50 micromicrofarads.
Capacitor 24—200 micromicrofarads.
Capacitor 25—27 micromicrofarads.
Capacitors 26, 27 and 32—variable 1-4 micromicrofarads.
Sensing capacitor 33—approximately 2 micromicrofarads.
Resistor 29—900 ohms.
Resistors 30 and 31—8200 ohms.
Diode 28—1N60.
Tubes 1 and 9—6U8.

I do not limit my invention to the exact form shown in the drawing, for obviously changes may be made therein within the scope of the claims.

I claim:
1. A measuring system for monitoring a measurable value and sensing variations therein from a predetermined value, comprising a source of continuous alternating waves; twin-T network means including an input and an output terminal both referred to a common ground and including a value sensing element; wave rectifier means coupled between ground and said output terminal; a cable having a first grounded conductor and a second conductor and having a characteristic impedance which is low as compared with the impedance of the network at its input terminal; impedance matching means for matching the characteristic impedance of the cable to the input impedance of the network and coupled at one end to the latter, the matching means and the network means having a direct-current path from the cable to the rectifier means; alternating-current component and direct-current component separating means connected to the other end of the cable and coupling the wave source to the cable to excite the network means; and direct-current meter means coupled to said separating means to measure the rectified direct-current component.

2. In a system as set forth in claim 1, said twin-T network means comprising resistance and capacitance elements, and said impedance matching means having an output impedance including an inductive reactance adjusted to precisely tune out the capacitive-reactance component of the input impedance of the network means at the frequency of said alternating waves.

3. In a system as set forth in claim 1, said component separating means comprising a winding coupled at one end to said second cable conductor, and a capacitor coupled between the other end of the winding and ground, the meter means being connected across the capacitor, and the source being inductively coupled to the winding.

4. A measuring system for monitoring a measurable value and sensing variations therein from a predetermined value, comprising a source of continuous alternating waves; twin-T network means including an input and an output terminal both referred to a common terminal and said network means including a value sensing element; wave rectifier means coupled between the common terminal and said output terminal; a cable having a first conductor connected with the common terminal and with said source and having a second conductor connected with said input terminal; the network means having a direct-current path from the second conductor of the cable to the rectifier means; alternating-current component and direct-current component separating means connected between the other end of the second conductor of the cable and the wave source to pass the alternating wave from the latter to excite the network means; and direct-current meter means coupled to said separating means to receive and measure the rectified direct-current component.

5. In a system as set forth in claim 1, said component separating means comprising a winding coupled at one end to said second cable conductor, and a capacitor coupled between the other end of the winding and said first cable conductor, the source being inductively coupled to the winding, and the meter means being connected in parallel with said capacitor.

References Cited in the file of this patent

UNITED STATES PATENTS

| 2,294,941 | Tuttle | Sept. 8, 1942 |
| 2,376,168 | Mounce | May 15, 1945 |
| 2,651,940 | Kline | Sept. 15, 1953 |
| 2,774,959 | Edelman et al. | Dec. 18, 1956 |

OTHER REFERENCES

Electronic Measurements, Terman S. Pettit, published by McGraw-Hill, 1952, pages 84–87 and 118 and 119.